(12) United States Patent
Lan et al.

(10) Patent No.: US 11,308,695 B2
(45) Date of Patent: Apr. 19, 2022

(54) OPTICAL APPARATUS AND AUGMENTED REALITY DEVICE

(71) Applicant: Lenovo (Beijing) Co., Ltd., Beijing (CN)

(72) Inventors: Shun Lan, Beijing (CN); Zhou Zhang, Beijing (CN); Lu Tang, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 0 days.

(21) Appl. No.: 16/231,812

(22) Filed: Dec. 24, 2018

(65) Prior Publication Data

US 2019/0197790 A1 Jun. 27, 2019

(30) Foreign Application Priority Data

Dec. 22, 2017 (CN) .......................... 201711416355.9

(51) Int. Cl.
| | | |
|---|---|---|
| *G06T 19/00* | (2011.01) | |
| *G02B 27/14* | (2006.01) | |
| *G02B 27/01* | (2006.01) | |

(52) U.S. Cl.
CPC ........ *G06T 19/006* (2013.01); *G02B 27/0172* (2013.01); *G02B 27/14* (2013.01); *G02B 2027/011* (2013.01); *G02B 2027/013* (2013.01); *G02B 2027/0178* (2013.01)

(58) Field of Classification Search
CPC .. G06T 19/006; G02B 27/0172; G02B 27/14; G02B 2027/011; G02B 2027/013; G02B 2027/0178
See application file for complete search history.

(56) References Cited

U.S. PATENT DOCUMENTS

| | | | | |
|---|---|---|---|---|
| 4,881,801 A | * | 11/1989 | Gebelein ................ | G02B 17/08 359/364 |
| 5,404,246 A | * | 4/1995 | Kaneko .................... | G02B 9/62 359/649 |
| 5,517,366 A | * | 5/1996 | Togino ............... | G02B 17/0804 359/364 |
| 5,644,436 A | * | 7/1997 | Togino .................. | G02B 13/18 359/730 |

(Continued)

FOREIGN PATENT DOCUMENTS

| CN | 101359089 A | 2/2009 |
|---|---|---|
| CN | 203786390 U | 8/2014 |

(Continued)

OTHER PUBLICATIONS

Yan Lou, "Basic application of computer and information technology", Tsinghua university press, Jul. 31, 2016 (Jul. 31, 2016), p. 90-91 6 Pages (including translation).

*Primary Examiner* — Charles L Beard
(74) *Attorney, Agent, or Firm* — Anova Law Group, PLLC

(57) ABSTRACT

An optical apparatus and an augmented reality device are provided. The optical apparatus includes an inner surface. The inner surface includes a predetermined region serving as a curved mirror with a predetermined optical parameter for reflection imaging of a virtual image of a virtual world. The optical apparatus further includes an outer surface. The outer surface and the inner surface are used for refraction imaging of a real image of a real world. The virtual image and the real image are integrated for forming a scene of augmented reality.

8 Claims, 13 Drawing Sheets

(56) References Cited

U.S. PATENT DOCUMENTS

| | | | | |
|---|---|---|---|---|
| 5,661,604 A * | 8/1997 | Kuba | G02B 27/0172 | 359/633 |
| 5,691,850 A * | 11/1997 | Arisaka | G02B 25/001 | 359/644 |
| 5,745,295 A * | 4/1998 | Takahashi | G02B 17/0816 | 359/621 |
| 5,754,344 A * | 5/1998 | Fujiyama | H04N 13/344 | 359/631 |
| 5,926,321 A * | 7/1999 | Shikama | G02B 25/001 | 359/644 |
| 5,966,242 A * | 10/1999 | Yamanaka | G02B 27/0172 | 359/618 |
| 5,986,816 A * | 11/1999 | Shikama | G02B 25/001 | 359/644 |
| 6,094,242 A * | 7/2000 | Yamanaka | G02B 5/3016 | 349/115 |
| 6,094,309 A * | 7/2000 | Ophey | G02B 27/0037 | 359/618 |
| 6,201,647 B1 * | 3/2001 | Ohzawa | G02B 25/001 | 359/630 |
| 6,246,383 B1 * | 6/2001 | Ophey | G02B 27/0172 | 345/8 |
| 6,417,820 B1 * | 7/2002 | Choi | G02B 27/0172 | 345/7 |
| 6,519,090 B2 * | 2/2003 | Endo | G02B 5/3016 | 349/11 |
| 6,813,085 B2 * | 11/2004 | Richards | G02B 27/017 | 345/8 |
| 6,999,239 B1 * | 2/2006 | Martins | G02B 27/0172 | 359/630 |
| 7,095,570 B2 * | 8/2006 | Amanai | G02B 9/34 | 359/680 |
| 7,545,571 B2 * | 6/2009 | Garoutte | G02B 27/0172 | 345/7 |
| 7,602,552 B1 * | 10/2009 | Blumenfeld | G02B 27/0103 | 359/630 |
| 7,667,783 B2 * | 2/2010 | Hong | G02B 30/50 | 349/11 |
| 8,189,272 B1 * | 5/2012 | Huang | G02B 13/004 | 359/715 |
| 8,582,209 B1 * | 11/2013 | Amirparviz | G02B 5/0294 | 359/630 |
| 9,316,816 B2 * | 4/2016 | Noda | G02B 13/18 | |
| 9,350,908 B1 * | 5/2016 | Hsu | G02B 13/0045 | |
| 9,395,525 B2 * | 7/2016 | Matsumoto | G02B 17/0816 | |
| 9,578,423 B2 * | 2/2017 | Liu | H04R 17/02 | |
| 9,690,324 B2 * | 6/2017 | Liu | G06F 1/162 | |
| 9,720,227 B2 * | 8/2017 | Border | G02B 27/0172 | |
| 9,720,232 B2 * | 8/2017 | Hua | G02B 27/0093 | |
| 9,804,364 B2 * | 10/2017 | Sekine | G02B 9/00 | |
| 9,810,908 B2 * | 11/2017 | Tanahashi | G02B 27/0101 | |
| 9,841,598 B2 * | 12/2017 | Ouderkirk | G02B 27/0172 | |
| 9,854,196 B2 * | 12/2017 | Liu | H04N 21/4122 | |
| 9,874,760 B2 * | 1/2018 | Hua | H04N 13/339 | |
| 9,910,284 B1 * | 3/2018 | Nortrup | G02B 5/04 | |
| 9,939,646 B2 * | 4/2018 | Osterhout | G06F 5/10 | |
| 9,939,648 B2 * | 4/2018 | Lee | G02B 27/0172 | |
| 9,952,435 B2 * | 4/2018 | Tanaka | G02B 27/0176 | |
| 9,954,613 B1 * | 4/2018 | Goorjian | G01J 1/0411 | |
| 10,042,157 B2 * | 8/2018 | Matsuo | G02B 25/001 | |
| 10,120,194 B2 * | 11/2018 | Cobb | G02B 1/041 | |
| 10,129,984 B1 * | 11/2018 | Lamkin | H05K 1/028 | |
| 10,175,487 B2 * | 1/2019 | Benko | G06T 19/006 | |
| 10,175,785 B2 * | 1/2019 | Liu | G06F 3/0487 | |
| 10,191,279 B2 * | 1/2019 | Nortrup | G02B 27/0093 | |
| 10,197,810 B2 * | 2/2019 | Seo | G02B 5/3025 | |
| 10,234,604 B1 * | 3/2019 | Huang | G02B 3/08 | |
| 10,277,893 B1 * | 4/2019 | Yoon | H04N 5/2356 | |
| 10,281,729 B2 * | 5/2019 | Kuo | G02B 27/0179 | |
| 10,318,226 B2 * | 6/2019 | Zhang | G06F 3/1423 | |
| 10,326,983 B2 * | 6/2019 | Hua | G06K 9/00671 | |
| 10,371,998 B2 * | 8/2019 | Sahlsten | G02B 27/0101 | |
| 10,422,995 B2 * | 9/2019 | Haddick | G06F 1/163 | |
| 10,427,598 B2 * | 10/2019 | Yamagata | G02B 27/0149 | |
| 10,466,481 B2 * | 11/2019 | Li | G02B 6/003 | |
| 10,466,491 B2 * | 11/2019 | Osterhout | G02B 27/0176 | |
| 10,473,926 B2 * | 11/2019 | Lee | G02B 27/01 | |
| 10,495,888 B2 * | 12/2019 | Yonekubo | G02B 27/0172 | |
| 10,510,812 B2 * | 12/2019 | Lamkin | H01L 27/3234 | |
| 10,520,734 B1 * | 12/2019 | Chan | G02B 17/0856 | |
| 10,527,819 B2 * | 1/2020 | Bone | G02B 25/001 | |
| 10,527,859 B2 * | 1/2020 | Tanaka | G02B 27/0172 | |
| 10,534,172 B2 * | 1/2020 | Tanaka | G02B 27/0172 | |
| 10,545,347 B2 * | 1/2020 | Bierhuizen | G02B 27/0101 | |
| 10,564,427 B2 * | 2/2020 | Ouderkirk | G02B 5/3041 | |
| 10,567,745 B2 * | 2/2020 | Patel | H04N 13/344 | |
| 10,591,707 B2 * | 3/2020 | Khan | G02B 27/0018 | |
| 10,594,951 B2 * | 3/2020 | Lamkin | G06T 7/557 | |
| 10,600,352 B1 * | 3/2020 | Wheelwright | G02B 27/0172 | |
| 10,613,320 B2 * | 4/2020 | Masson | G02B 5/0294 | |
| 10,642,044 B2 * | 5/2020 | Ouderkirk | G02B 27/0176 | |
| 10,652,529 B2 * | 5/2020 | Lamkin | H01L 25/167 | |
| 10,663,626 B2 * | 5/2020 | Benitez | G02B 30/24 | |
| 10,663,724 B1 * | 5/2020 | Laduke | G03B 37/04 | |
| 10,663,736 B2 * | 5/2020 | Tanaka | G02B 13/06 | |
| 10,816,752 B2 * | 10/2020 | Wang | G02B 7/09 | |
| 10,816,766 B2 * | 10/2020 | Fang | G02B 9/62 | |
| 10,816,767 B2 * | 10/2020 | Fang | G02B 13/0045 | |
| 10,881,287 B1 * | 1/2021 | Ouderkirk | G02B 27/0176 | |
| 10,890,695 B2 * | 1/2021 | Piskunov | G02B 7/28 | |
| 10,901,291 B1 * | 1/2021 | Sulai | G02F 1/29 | |
| 10,948,801 B1 * | 3/2021 | Lu | G02C 7/12 | |
| 10,955,675 B1 * | 3/2021 | Wheelwright | H04W 52/0251 | |
| 10,962,791 B1 * | 3/2021 | Ouderkirk | G02B 7/023 | |
| 10,962,795 B1 * | 3/2021 | Gollier | G02B 27/286 | |
| 10,976,551 B2 * | 4/2021 | Cobb | G02B 3/04 | |
| 2002/0024743 A1 * | 2/2002 | Endo | G02B 27/0172 | 359/643 |
| 2002/0057498 A1 * | 5/2002 | Kobayashi | G02B 27/0172 | 359/630 |
| 2002/0131168 A1 * | 9/2002 | Sadler | G02B 23/02 | 359/399 |
| 2003/0089691 A1 * | 5/2003 | Tanaka | B23K 26/0732 | 219/121.67 |
| 2003/0107816 A1 * | 6/2003 | Takagi | G02B 17/086 | 359/631 |
| 2003/0184868 A1 * | 10/2003 | Geist | G02B 27/0172 | 359/630 |
| 2004/0160680 A1 * | 8/2004 | Shinohara | G02B 9/04 | 359/717 |
| 2004/0227703 A1 * | 11/2004 | Lamvik | G09G 3/3233 | 345/76 |
| 2005/0117497 A1 * | 6/2005 | Komma | G11B 7/1275 | 369/112.16 |
| 2006/0072205 A1 * | 4/2006 | Li | G02B 27/0172 | 359/630 |
| 2006/0098293 A1 * | 5/2006 | Garoutte | G02B 27/0172 | 359/630 |
| 2007/0070508 A1 * | 3/2007 | Ruhle | G02B 27/0172 | 359/630 |
| 2008/0013185 A1 * | 1/2008 | Garoutte | G02B 27/0172 | 359/630 |
| 2008/0106489 A1 * | 5/2008 | Brown | G02B 27/0172 | 345/9 |
| 2008/0117289 A1 * | 5/2008 | Schowengerdt | G02B 26/005 | 348/46 |
| 2009/0147126 A1 * | 6/2009 | Miyoshi | H04N 5/2254 | 348/360 |
| 2009/0147331 A1 * | 6/2009 | Ashkenazi | G02B 5/32 | 359/13 |
| 2009/0161225 A1 * | 6/2009 | Liu | G02B 27/0172 | 359/643 |
| 2010/0060551 A1 * | 3/2010 | Sugiyama | G02B 27/0172 | 345/8 |
| 2010/0097710 A1 * | 4/2010 | Lai | G02B 9/34 | 359/773 |
| 2010/0220399 A1 * | 9/2010 | Ohtake | G02B 15/144113 | 359/687 |
| 2010/0321788 A1 * | 12/2010 | Wang | G02B 13/004 | 359/666 |

(56) References Cited

U.S. PATENT DOCUMENTS

| | | | |
|---|---|---|---|
| 2011/0102874 A1* | 5/2011 | Sugiyama | G02B 26/106 359/205.1 |
| 2011/0292333 A1* | 12/2011 | Kozaki | G02B 27/0172 351/44 |
| 2011/0292513 A1* | 12/2011 | Kubota | G02B 27/0172 359/630 |
| 2012/0002295 A1* | 1/2012 | Dobschal | G02B 3/08 359/630 |
| 2012/0105310 A1* | 5/2012 | Sverdrup | G02B 27/017 345/8 |
| 2012/0154536 A1* | 6/2012 | Stoker | H04N 5/2258 348/46 |
| 2012/0162486 A1* | 6/2012 | Asakura | G02B 3/10 348/241 |
| 2012/0162549 A1* | 6/2012 | Gao | G02B 27/283 349/11 |
| 2012/0293874 A1* | 11/2012 | Matsui | G02B 13/0035 359/708 |
| 2012/0300318 A1* | 11/2012 | Lin | G02B 9/34 359/715 |
| 2013/0021226 A1* | 1/2013 | Bell | G02B 27/017 345/8 |
| 2013/0135754 A1* | 5/2013 | Ise | G02B 13/0045 359/714 |
| 2013/0169931 A1* | 7/2013 | Lee | A61B 3/12 351/206 |
| 2013/0258164 A1* | 10/2013 | Chang | G02B 13/18 348/345 |
| 2013/0278714 A1* | 10/2013 | Hirose | G02B 13/06 348/36 |
| 2014/0146394 A1* | 5/2014 | Tout | G09B 9/307 359/630 |
| 2014/0160338 A1* | 6/2014 | Kikuchi | G02B 13/22 348/333.09 |
| 2014/0218806 A1* | 8/2014 | Ishizuka | G02B 25/001 359/644 |
| 2014/0266986 A1* | 9/2014 | Magyari | G02B 27/0172 345/8 |
| 2014/0266990 A1* | 9/2014 | Makino | G02B 27/0172 345/8 |
| 2014/0307335 A1* | 10/2014 | Kawamura | G02B 13/0045 359/714 |
| 2014/0361957 A1* | 12/2014 | Hua | G06F 3/013 345/8 |
| 2015/0022901 A1* | 1/2015 | Komatsu | G02B 15/173 359/688 |
| 2015/0049004 A1* | 2/2015 | Deering | G02B 27/0093 345/8 |
| 2015/0070389 A1* | 3/2015 | Goto | G06T 7/00 345/633 |
| 2015/0070773 A1* | 3/2015 | Wang | G02B 27/0176 359/631 |
| 2015/0103152 A1* | 4/2015 | Qin | G02B 27/0176 348/53 |
| 2015/0103412 A1* | 4/2015 | Ori | G02B 13/009 359/689 |
| 2015/0138047 A1* | 5/2015 | Hwang | G02B 27/01 345/7 |
| 2015/0168730 A1* | 6/2015 | Ashkenazi | G02B 27/0172 359/631 |
| 2015/0177906 A1* | 6/2015 | Yairi | G06F 3/016 345/648 |
| 2015/0185828 A1* | 7/2015 | Wu | G06F 3/011 345/156 |
| 2015/0192775 A1* | 7/2015 | Suzuki | G02B 27/0101 359/630 |
| 2015/0219898 A1* | 8/2015 | Ko | G02B 27/0172 359/631 |
| 2015/0234477 A1* | 8/2015 | Abovitz | G02B 27/017 382/103 |
| 2015/0253543 A1* | 9/2015 | Mercado | G02B 13/0065 348/370 |
| 2015/0253575 A1* | 9/2015 | Huang | G02B 27/0172 359/717 |
| 2015/0253647 A1* | 9/2015 | Mercado | G02B 13/002 348/373 |
| 2015/0279114 A1* | 10/2015 | Yonekubo | G06T 19/006 345/633 |
| 2015/0370074 A1* | 12/2015 | McDowall | G02B 27/0172 349/11 |
| 2016/0011404 A1* | 1/2016 | Suzuki | G02B 27/0025 359/708 |
| 2016/0077319 A1* | 3/2016 | Yatsu | G02B 13/18 353/98 |
| 2016/0085084 A1* | 3/2016 | Masson | G02B 27/48 359/633 |
| 2016/0091722 A1* | 3/2016 | Liu | G02B 27/0172 345/8 |
| 2016/0097929 A1* | 4/2016 | Yee | G06T 19/006 359/631 |
| 2016/0124192 A1* | 5/2016 | Koreeda | G02B 27/0025 359/713 |
| 2016/0139363 A1* | 5/2016 | Hsu | H04N 5/2252 348/340 |
| 2016/0154216 A1* | 6/2016 | Liao | G02B 13/004 348/335 |
| 2016/0161718 A1* | 6/2016 | Koreeda | G02B 13/0045 359/714 |
| 2016/0170208 A1* | 6/2016 | Border | G02B 27/0093 359/471 |
| 2016/0198949 A1* | 7/2016 | Spitzer | G02B 27/0093 351/204 |
| 2016/0209624 A1* | 7/2016 | Usui | G02B 13/004 |
| 2016/0209652 A1* | 7/2016 | Ichihashi | G03B 21/60 |
| 2016/0216483 A1* | 7/2016 | Chen | G02B 13/0045 |
| 2016/0216484 A1* | 7/2016 | Chen | G02B 13/0045 |
| 2016/0223819 A1* | 8/2016 | Liu | G02B 27/0172 |
| 2016/0241754 A1* | 8/2016 | Jhang | G02B 9/60 |
| 2016/0261780 A1* | 9/2016 | Lin | G02B 13/0045 |
| 2016/0278695 A1* | 9/2016 | Wang | H04N 13/204 |
| 2016/0291325 A1* | 10/2016 | Kasahara | G02B 27/0101 |
| 2016/0291326 A1* | 10/2016 | Evans | G02B 3/04 |
| 2016/0314564 A1* | 10/2016 | Jones | G06T 15/20 |
| 2016/0320619 A1* | 11/2016 | Watanabe | G02B 25/001 |
| 2016/0327793 A1* | 11/2016 | Chen | G02B 27/0172 |
| 2016/0356987 A1* | 12/2016 | Liu | G02B 13/004 |
| 2017/0045742 A1* | 2/2017 | Greenhalgh | G02B 27/0081 |
| 2017/0068095 A1* | 3/2017 | Holland | B29D 11/00461 |
| 2017/0123187 A1* | 5/2017 | Heu | G02B 27/0025 |
| 2017/0193687 A1* | 7/2017 | Lo | G06T 5/006 |
| 2017/0219799 A1* | 8/2017 | Hsueh | G02B 9/34 |
| 2017/0255015 A1* | 9/2017 | Geng | G02B 6/08 |
| 2017/0269366 A1* | 9/2017 | Lee | G02B 27/0172 |
| 2017/0285343 A1* | 10/2017 | Belenkii | G02B 27/0172 |
| 2017/0311794 A1* | 11/2017 | Inoue | A61B 3/0083 |
| 2017/0315343 A1* | 11/2017 | Nagler | G02B 25/001 |
| 2017/0315347 A1* | 11/2017 | Juhola | G02B 6/003 |
| 2017/0343822 A1* | 11/2017 | Border | G02B 27/286 |
| 2017/0357088 A1* | 12/2017 | Matsuzaki | G02B 27/10 |
| 2017/0357100 A1* | 12/2017 | Ouderkirk | F21V 5/02 |
| 2017/0371163 A1* | 12/2017 | Ries | G02B 27/0172 |
| 2018/0003978 A1* | 1/2018 | Benitez | G02B 27/01 |
| 2018/0017795 A1* | 1/2018 | Li | G02B 27/0081 |
| 2018/0024355 A1* | 1/2018 | Gao | G02B 6/00 359/630 |
| 2018/0039052 A1* | 2/2018 | Khan | G02B 27/283 |
| 2018/0039061 A1* | 2/2018 | Hairston | G02B 23/12 |
| 2018/0045916 A1* | 2/2018 | Chang | G02B 13/0045 |
| 2018/0067317 A1* | 3/2018 | Barton | G02B 27/0176 |
| 2018/0081151 A1* | 3/2018 | Bone | G02B 27/027 |
| 2018/0107000 A1* | 4/2018 | Sung | G02B 3/14 |
| 2018/0120568 A1* | 5/2018 | Miller | G03B 21/2013 |
| 2018/0143401 A1* | 5/2018 | Bone | G02B 27/0172 |
| 2018/0146188 A1* | 5/2018 | Simmonds | H04N 13/344 |
| 2018/0157320 A1* | 6/2018 | Trail | G06F 3/011 |
| 2018/0196231 A1* | 7/2018 | Bone | G02B 25/001 |
| 2018/0196264 A1* | 7/2018 | Quere | G02B 27/0172 |
| 2018/0196265 A1* | 7/2018 | Bouchier | G02F 1/163 |
| 2018/0203205 A1* | 7/2018 | Cao | G02B 27/0172 |
| 2018/0203505 A1* | 7/2018 | Trail | G02B 27/0093 |

(56) References Cited

U.S. PATENT DOCUMENTS

| | | | |
|---|---|---|---|
| 2018/0210181 A1* | 7/2018 | Kim | G03B 21/28 |
| 2018/0239117 A1* | 8/2018 | Lee | G02B 13/0045 |
| 2018/0275394 A1* | 9/2018 | Yeoh | G02B 3/14 |
| 2018/0275408 A1* | 9/2018 | Deng | G02B 27/0172 |
| 2018/0284454 A1* | 10/2018 | Reed | G06K 9/00671 |
| 2018/0307036 A1* | 10/2018 | Iba | G02B 25/001 |
| 2018/0341110 A1* | 11/2018 | Hirata | G02B 27/0983 |
| 2019/0004325 A1* | 1/2019 | Connor | G02B 27/0172 |
| 2019/0018235 A1* | 1/2019 | Ouderkirk | G02B 27/0068 |
| 2019/0025475 A1* | 1/2019 | Piskunov | G02B 25/00 |
| 2019/0025688 A1* | 1/2019 | Maynard | G02B 26/12 |
| 2019/0026871 A1* | 1/2019 | Han | G02B 27/0176 |
| 2019/0049733 A1* | 2/2019 | Jiang | G02B 27/106 |
| 2019/0064485 A1* | 2/2019 | Arita | G02B 13/04 |
| 2019/0064526 A1* | 2/2019 | Connor | G02B 6/0073 |
| 2019/0064527 A1* | 2/2019 | Kuo | G02B 27/0172 |
| 2019/0086662 A1* | 3/2019 | Matsuzaki | G02B 27/0179 |
| 2019/0086675 A1* | 3/2019 | Carollo | G02B 27/0172 |
| 2019/0094486 A1* | 3/2019 | Wang | G02B 27/0172 |
| 2019/0094981 A1* | 3/2019 | Bradski | G06F 3/012 |
| 2019/0114950 A1* | 4/2019 | Calm | G02B 27/0172 |
| 2019/0146198 A1* | 5/2019 | Khan | G02B 27/283 345/8 |
| 2019/0171005 A1* | 6/2019 | Lee | G02B 27/0056 |
| 2019/0179409 A1* | 6/2019 | Jones | G06F 3/013 |
| 2019/0183340 A1* | 6/2019 | Mo | A61B 3/107 |
| 2019/0191991 A1* | 6/2019 | Nozawa | A61B 3/102 |
| 2019/0197790 A1* | 6/2019 | Lan | G02B 27/0172 |
| 2019/0227322 A1* | 7/2019 | Schaub | G02B 27/0172 |
| 2019/0227331 A1* | 7/2019 | Roessel | G02B 27/0955 |
| 2019/0235196 A1* | 8/2019 | Hong | G03B 21/14 |
| 2019/0265440 A1* | 8/2019 | Tabata | G02B 9/60 |
| 2019/0265493 A1* | 8/2019 | Takagi | G02B 27/0172 |
| 2019/0265494 A1* | 8/2019 | Takagi | G02B 27/28 |
| 2019/0293938 A1* | 9/2019 | Le Saux | G06F 3/013 |
| 2019/0302437 A1* | 10/2019 | Hillman | G03B 21/367 |
| 2019/0310705 A1* | 10/2019 | Hincapie Ramos | H04N 13/332 |
| 2019/0331919 A1* | 10/2019 | Huo | H04N 13/383 |
| 2019/0339518 A1* | 11/2019 | Zanden | G02B 27/0101 |
| 2019/0346679 A1* | 11/2019 | Miller | G02B 26/005 |
| 2019/0384068 A1* | 12/2019 | Park | G02B 27/0172 |
| 2020/0033586 A1* | 1/2020 | Suzuki | G02B 13/18 |
| 2020/0033607 A1* | 1/2020 | Takeda | G02B 13/22 |
| 2020/0041785 A1* | 2/2020 | Takagi | G02B 27/0172 |
| 2020/0049800 A1* | 2/2020 | Valouch | G01S 17/46 |
| 2020/0049956 A1* | 2/2020 | Chan | G02B 9/60 |
| 2020/0081234 A1* | 3/2020 | Etter | G02B 5/28 |
| 2020/0089017 A1* | 3/2020 | Wu | G02B 5/3083 |
| 2020/0096772 A1* | 3/2020 | Adema | G02C 7/086 |
| 2020/0096816 A1* | 3/2020 | Lee | G02F 1/133528 |
| 2020/0124853 A1* | 4/2020 | Lo | G02B 6/0035 |
| 2020/0132988 A1* | 4/2020 | Smithwick | G02B 27/0172 |
| 2020/0142254 A1* | 5/2020 | Ryu | G02B 27/286 |
| 2020/0143524 A1* | 5/2020 | Selstad | G06T 5/006 |
| 2020/0150405 A1* | 5/2020 | Bates | G02B 13/16 |
| 2020/0151956 A1* | 5/2020 | Goslin | G06T 19/006 |
| 2020/0180069 A1* | 6/2020 | Sangu | G02B 27/108 |
| 2020/0183079 A1* | 6/2020 | Leister | G03H 1/2294 |
| 2020/0192079 A1* | 6/2020 | Tohara | G02B 27/0172 |
| 2020/0192096 A1* | 6/2020 | Chen | G02F 1/133528 |
| 2020/0201047 A1* | 6/2020 | Nakamura | G02B 6/0036 |
| 2020/0225477 A1* | 7/2020 | Chan | G02C 9/00 |
| 2020/0249475 A1* | 8/2020 | Amirsolaimani | G02B 27/0172 |
| 2020/0264441 A1* | 8/2020 | Lee | G09G 5/026 |
| 2020/0319430 A1* | 10/2020 | Hosono | G02B 9/62 |
| 2020/0319456 A1* | 10/2020 | Yatsu | G02B 17/0621 |
| 2020/0326543 A1* | 10/2020 | Kim | G06K 9/00604 |
| 2020/0341268 A1* | 10/2020 | Amirsolaimani | G02B 27/0068 |
| 2020/0341278 A1* | 10/2020 | Tanaka | G02B 27/0172 |
| 2020/0341315 A1* | 10/2020 | Gollier | G02B 1/08 |
| 2020/0348528 A1* | 11/2020 | Jamali | G02B 27/0101 |
| 2020/0379214 A1* | 12/2020 | Lee | G02B 27/0172 |
| 2020/0409034 A1* | 12/2020 | Kuo | G02B 25/001 |
| 2020/0409037 A1* | 12/2020 | Kuo | G02B 13/0045 |
| 2021/0018955 A1* | 1/2021 | Ciou | G02B 27/0172 |
| 2021/0033865 A1* | 2/2021 | Smith | G02B 27/0172 |
| 2021/0033868 A1* | 2/2021 | Inoguchi | G02B 17/0816 |
| 2021/0088782 A1* | 3/2021 | Zhao | G02B 27/0068 |
| 2021/0109352 A1* | 4/2021 | Lee | G02B 27/14 |
| 2021/0132267 A1* | 5/2021 | Hernandez | G02B 27/0172 |
| 2021/0132342 A1* | 5/2021 | Kim | G02B 9/62 |
| 2021/0132388 A1* | 5/2021 | Yamaguchi | G02B 3/00 |
| 2021/0209364 A1* | 7/2021 | Park | G02B 27/0176 |
| 2021/0223551 A1* | 7/2021 | Zannoli | G02B 27/0093 |
| 2021/0227187 A1* | 7/2021 | Stanley | H04N 9/3129 |
| 2021/0258555 A1* | 8/2021 | Lei | H04N 19/521 |
| 2021/0271055 A1* | 9/2021 | Kuo | G02B 13/0045 |
| 2021/0271087 A1* | 9/2021 | Jung | G02B 5/08 |
| 2021/0294117 A1* | 9/2021 | Mizuta | G02B 25/001 |
| 2021/0334943 A1* | 10/2021 | Chu | G02B 27/022 |
| 2021/0358084 A1* | 11/2021 | Bleyer | H04N 13/239 |
| 2021/0364799 A1* | 11/2021 | Guo | G02B 27/0101 |
| 2021/0364802 A1* | 11/2021 | Uchiyama | G02C 7/16 |
| 2021/0373336 A1* | 12/2021 | Price | G06T 7/579 |

FOREIGN PATENT DOCUMENTS

| | | |
|---|---|---|
| CN | 104749779 A | 7/2015 |
| CN | 104903777 A | 9/2015 |
| CN | 105892058 A | 8/2016 |
| CN | 107247334 A | 10/2017 |

* cited by examiner

OPTICAL APPARATUS AND AUGMENTED REALITY DEVICE

CROSS-REFERENCES TO RELATED APPLICATIONS

This application claims priority of Chinese Patent Application No. 201711416355.9, filed on Dec. 22, 2017, the entire contents of which are hereby incorporated by reference.

FIELD OF THE DISCLOSURE

The present disclosure relates to an optical apparatus and an augmented reality device.

BACKGROUND

Augmented reality (AR) technology (also known as mixed reality technology) is a technology that uses computer technology to apply virtual information onto the real world, having the virtual objects and real environment superimposed into the same space. A user can experience the combined virtual reality and real world scene using the augmented reality device. For example, the user can experience a combined virtual reality and real world scenes using electronic devices including wearable helmets, wearable glasses, and the like.

BRIEF SUMMARY OF THE DISCLOSURE

One aspect of the present disclosure provides an optical apparatus. The optical apparatus includes an inner surface. The inner surface includes a predetermined region serving as a curved mirror with a predetermined optical parameter for reflection imaging of a virtual image of a virtual world. The optical apparatus further includes an outer surface. The outer surface and the inner surface are used for refraction imaging of a real image of a real world. The virtual image and the real image are integrated for forming a scene of augmented reality.

Another aspect of the present disclosure provides an augmented reality device. The augmented reality device includes an image providing device for providing a virtual image of a virtual world and an optical apparatus. The optical apparatus includes an inner surface. The inner surface includes a predetermined region serving as a curved mirror with a predetermined optical parameter for reflection imaging of the virtual image of the virtual world. The optical apparatus further includes an outer surface. The outer surface and the inner surface are used for refraction imaging of a real image of a real world. The virtual image and the real image are integrated for forming a scene of augmented reality.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Figure 1A:
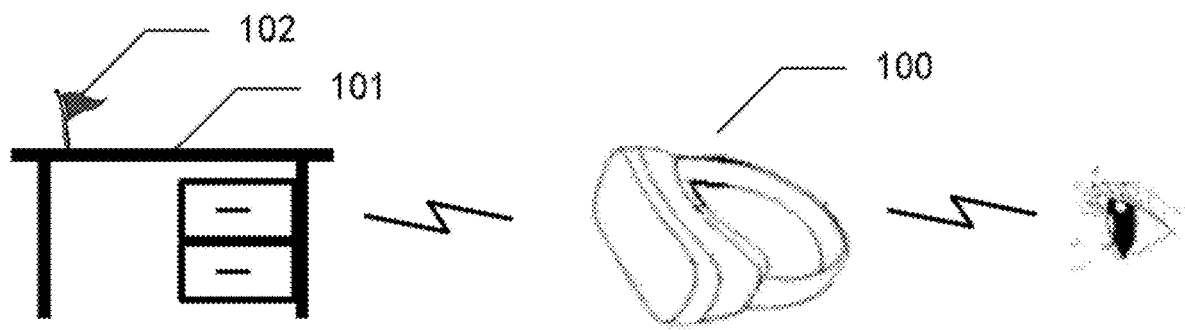
FIG. 1A illustrates an application scenario of an augmented reality device and an optical apparatus according to some embodiments of the present disclosure.

Embodiments of the present disclosure with reference to the accompanying drawings are described below. It should be understood, however, that these descriptions are merely illustrative and are not intended to limit the scope of the present disclosure. In addition, in the following description, descriptions of well-known structures and techniques are omitted so as not to obscure the concept of the present disclosure.

Terms used herein are only for describing embodiments only but not intended to limit the present disclosure. The terms "including", "comprising", and the like, as used herein, indicate the presence of stated features, steps, operations, and/or components, but do not exclude the presence or addition of one or more other features, steps, operations, or components.

Unless otherwise defined, all the technical and scientific terms used herein have the same or similar meanings as generally understood by those skilled in the art. It should be noted that terms used herein should be interpreted as having meanings that are consistent with the context of the present specification and should not be interpreted in an idealized or overly rigid manner.

In terms of a statement such as "at least one of A, B, and C, etc.," it should be generally interpreted in light of the ordinary understanding of the expression by those skilled in the art. For example, "a system including at least one of A, B, and C" shall include, but is not limited to, a system including A alone, a system including B alone, a system including C alone, a system including A and B, a system including A and C, a system including B and C, and/or a system including A, B, and C, etc. In terms of a statement similar to "at least one of A, B or C, etc.", it should generally be interpreted in light of the ordinary understanding of the expression by those skilled in the art. For example, "a system including at least one of A, B or C" shall include, but is not limited to, a system including A alone, a system including B alone, a system including C alone, a system including A and B, a system including A and C, a system including B and C, and/or a system including A, B, and C, etc. It should also be understood by those skilled in the art that all transitional words and/or phrases representing two or more alternative items, whether in the description, the claims or the drawings, should be understood as including one of these alternative items, or including any one of or all these alternative items. For example, the phrase "A or B" should be interpreted to include possibilities of including "A" or "B", or including "A" and "B".

A number of block diagrams and/or flowcharts are shown in the drawings. It should be understood that some blocks and/or flows or combinations thereof in the block diagrams and/or the flowcharts can be implemented by computer program instructions. These computer program instructions may be provided to a processor of a general-purpose computer, a special-purpose computer, or other programmable-data processing device such that, when executed by the processor, these instructions may be configured to generate a device that can implement functions/operations illustrated in these block diagrams and/or flowcharts.

Thus, embodiments of the present disclosure may be implemented in the form of hardware and/or software (including firmware, microcode, etc.). In addition, embodiments of the present disclosure may in a form of a computer program product on a computer-readable medium that stores instructions. The computer program product can be used by or in connection with a program instruction execution system. In the context of the present disclosure, a computer-readable medium may be any medium that can contain, store, communicate, propagate, or transport the program instructions. For example, the computer-readable medium may include, but is not limited to, an electronic, magnetic, optical, electromagnetic, infrared or semiconductor system, apparatus, device, or propagation medium. Optionally, examples of the computer-readable medium may include: a magnetic storage device such as a magnetic tape or a hard disk (HDD); an optical storage device such as a compact disk read-only memory (CD-ROM); a memory such as a random-access memory (RAM) or a flash memory; and/or a cable/wireless communication link.

Various embodiments of the present disclosure provides an optical apparatus to integrate images of the virtual world with the real world. The optical apparatus includes an inner surface and an outer surface. The inner surface includes a predetermined region, and the predetermined region serves as a curved mirror with predetermined optical parameters to perform reflection imaging of the virtual world. The outer surface and the inner surface can be used for refraction imaging of the real world.

Embodiments of the present disclosure also provide an augmented reality device that includes at least the optical apparatus and an image providing device for providing virtual images of the virtual world.

FIG. 1A illustrates an application scenario for using an augmented reality device and an optical apparatus according to some embodiments of the present disclosure. It should be noted that FIG. 1A only illustrates some examples for better understanding the technical content of the present disclosure, although one of ordinary skill in the art would know that any suitable devices, systems, environments, or scenarios may be encompassed herein according to various embodiments of the present disclosure.

As shown in FIG. 1A, one application scenario includes an augmented reality device 100. The augmented reality device 100 includes an optical apparatus described in the present disclosure and a virtual object, e.g., a small red flag 102, can be virtualized by the augmented reality device 100, while the application scenario also includes a real object, e.g., a desk 101. The virtual object (e.g., small red flag 102) is inserted into the real object (e.g., desk 101). The user can observe the real object (e.g., desk 101) having the virtual object (e.g., small red flag 102) inserted into the real object (e.g., desk 101) by using the augmented reality device 100.

In another embodiment, the augmented reality device 100 projects light to render a virtual object (e.g., small red flag 102) onto the inner surface of the optical apparatus and then reflected into the user's eyes, while light of a real object in the real world (e.g., desk 101) reflects directly from, e.g., the desk 101, through the outer surface of the optical apparatus, penetrates the inner surface, and then projects into the user's eyes. In this case, the augmented reality device 100 can reflect the light of a virtual object to the user's eyes through the optical apparatus, and does not need to add a curved mirror to the augmented reality device 100 to reflect the light from the virtual object to the user's eyes.

Figure 1B:
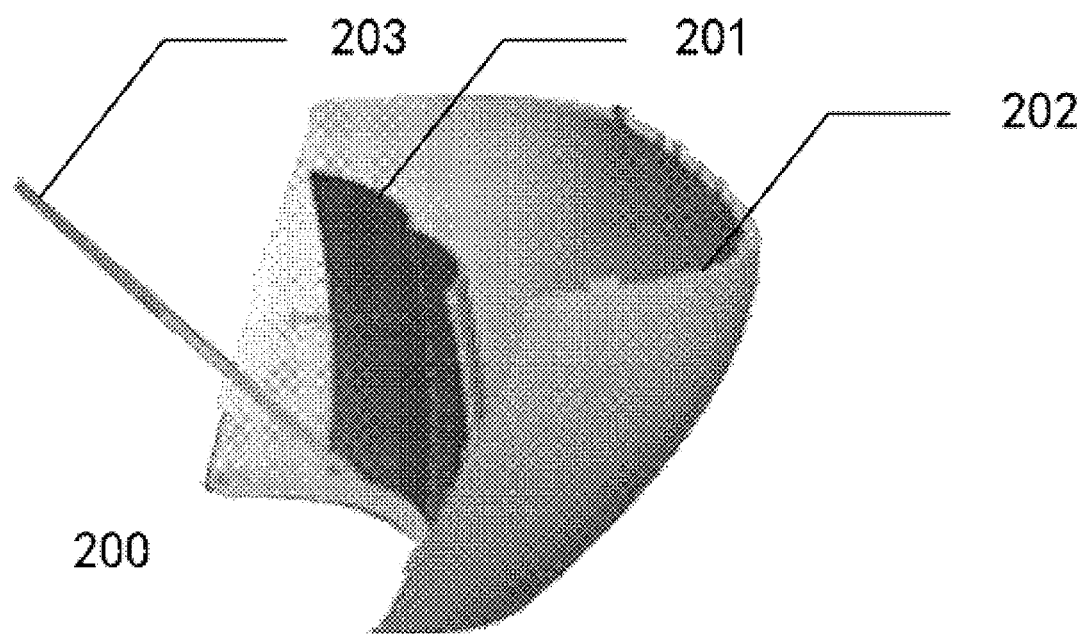
FIG. 1B illustrates a schematic diagram of an augmented reality device with a curved mirror.

FIG. 1B illustrates the schematic diagram of an augmented reality device with a curved mirror. As shown in FIG. 1B, the augmented reality device 200 includes a curved mirror 201, an optical apparatus 202 and a beam splitter 203. The augmented reality device 200 uses the curved mirror 201 to reflect the light to render the virtual object into the user's eye.

Figure 1C:
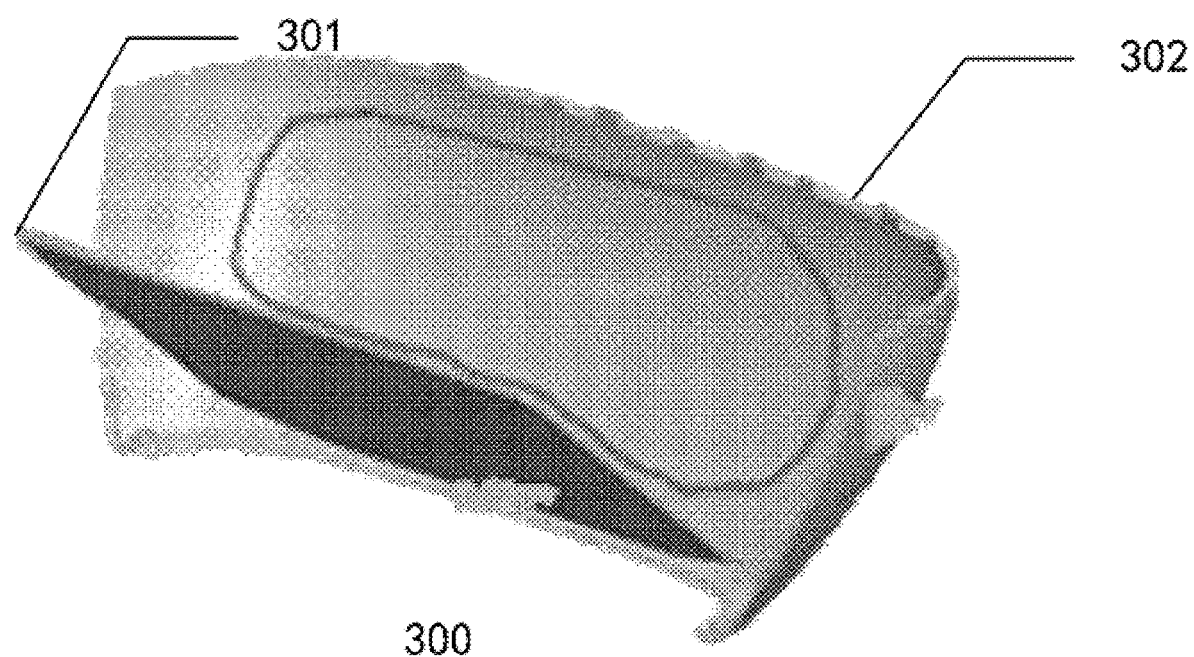
FIG. 1C illustrates a schematic diagram of an augmented reality device according to some embodiments of the present disclosure.

FIG. 1C illustrates the schematic diagram of an augmented reality device according to some embodiments of the present disclosure. As shown in FIG. 1C, the augmented reality device 300 may include a beam splitter 301 and an optical apparatus 302. The augmented reality device 300 reflects light of a virtual object to the user's eyes through the optical apparatus 302 without a need to use a curved mirror into the augmented reality device 300.

As disclosed, the disclosed optical apparatus and augmented reality device may eliminate the need to install the curved mirror, providing more compact apparatus/device with less materials.

As the light of real scene and virtual scene passing through the curved mirror in the relevant technology, there will be some loss of light. In embodiments of the present disclosure, lights pass through the inner surface and the outer surface of the optical apparatus, and then project into the eyes of the user, which reduces light loss in the optical path of the real scene image and virtual scene image.

Figure 1D:
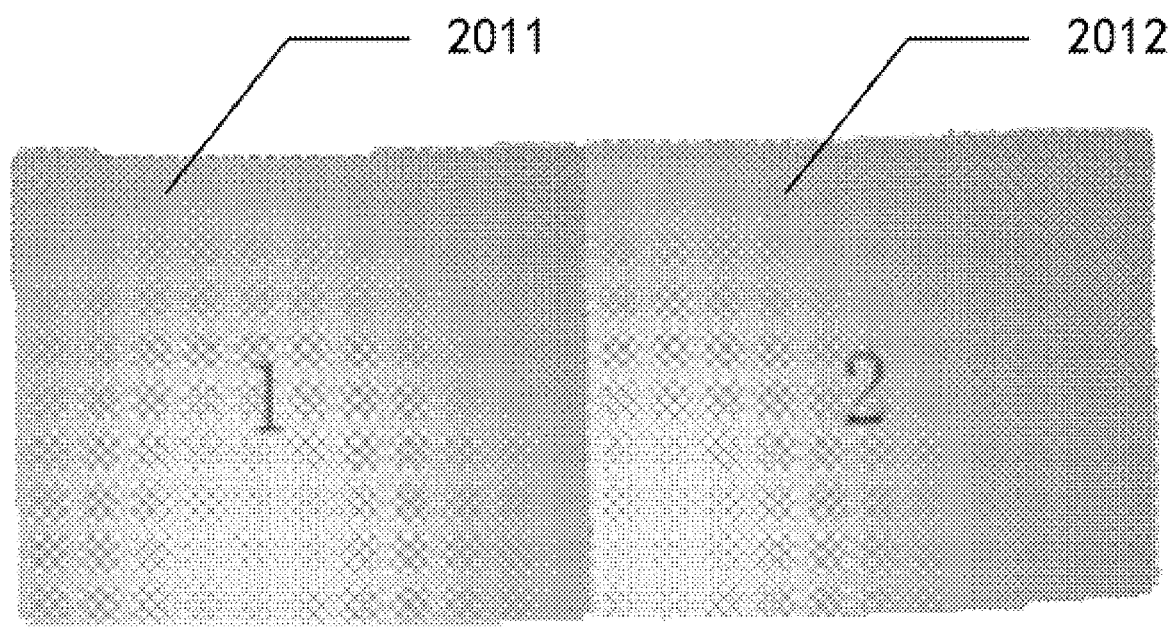
FIG. 1D illustrates a schematic diagram of a curved mirror structure of an augmented reality device.

FIG. 1D illustrates the schematic diagram of the curved mirror structure of an augmented reality device in the relevant technology. As shown in FIG. 1D, the two mirrors, 2011 and 2012, are separately arranged. Assembling the two curved surface mirrors 2011 and 2012 requires a high precision assembling process that has some shortcomings:

1. Since the two curved mirrors are molded separately, the faces of different batches of curved surfaces are difficult to be made consistently in different batches (due to manufacturing tolerances). The bias and tilt errors of curved mirrors are difficult to keep consistent in different batches, so the assembly accuracy is difficult to control.

2. Since the two curved mirrors are assembled separately, stresses exerted on each mirror during the assembly process are different. After the assembly, the curvatures of the two curved surface mirrors may vary with different degrees of deformation so the observed images of the left and right eyes may appear obvious differences.

Figure 1E:
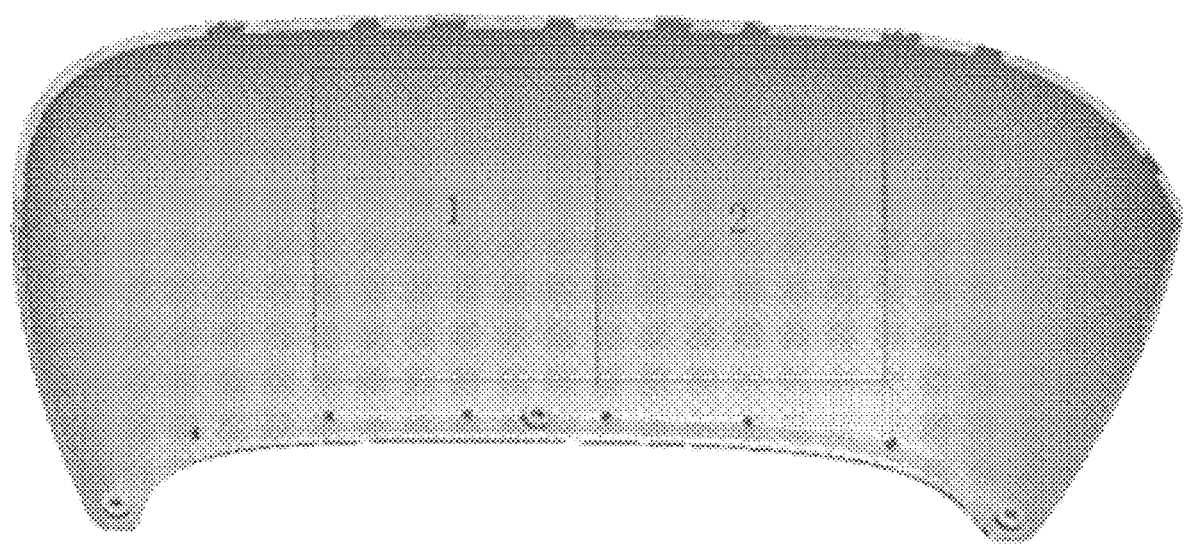
FIG. 1E illustrates a schematic view of a curved mirror structure of an augmented reality device according to some embodiments of the present disclosure.

As disclosed, functions of two curved mirrors are integrated into the inner surface of the optical apparatus so that the inner surface of the optical apparatus is functionally equivalent to the two curved mirrors, without including two curved mirrors. FIG. 1E illustrates the schematic diagram of the curved surface structure of an augmented reality device according to various embodiments of the present disclosure. As shown in FIG. 1E, the functions of the two curved mirrors are integrated into the inner surface of the optical apparatus, so that the values of curvature radius, thickness, size and other parameters of the corresponding region of the inner surface are designed to be the same or approximate to the parameters of the curved mirrors of the augmented reality device in the relevant technology.

The inner surface of the disclosed optical apparatus can serve as a curved mirror, and conventional curved mirrors of the augmented reality device can be removed from the disclosed augmented reality device. The disclosed optical apparatus can be integrated into an injection molding process, which eliminate installation of the mirrors. The virtual image viewed by the left and right eyes of a user does not have obvious differences.

In various embodiments, the augmented reality device can be a helmet, or a pair of glasses, although any suitable product forms, shapes and appearances may be used for the disclosed augmented reality device.

As such, the augmented reality device may integrate the virtual world with the real world, and may include an optical apparatus. The optical apparatus includes an inner surface and an outer surface. The inner surface includes a predetermined region, and the predetermined region provides the functions as of a curved mirror with a predetermined optical parameter for reflection imaging of the virtual world. The outer surface and the inner surface can be used for refraction imaging of the real world. An image providing device may be used for providing virtual images of the virtual world.

In some embodiments, an augmented reality device may also include a beam splitter for receiving the virtual image projected from the image providing device and reflecting the virtual image to the predetermined region of the inner surface of the optical apparatus.

Figure 2A:
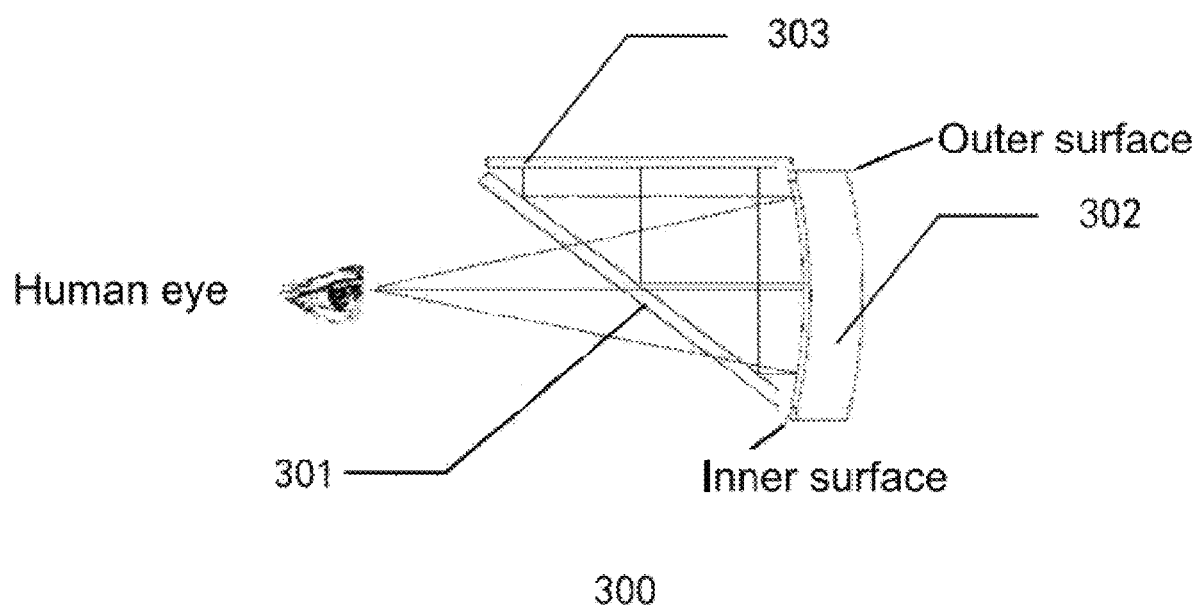
FIG. 2A illustrates a schematic diagram of virtual image formation of an augmented reality device according to some embodiments of the present disclosure.
Figure 2B:
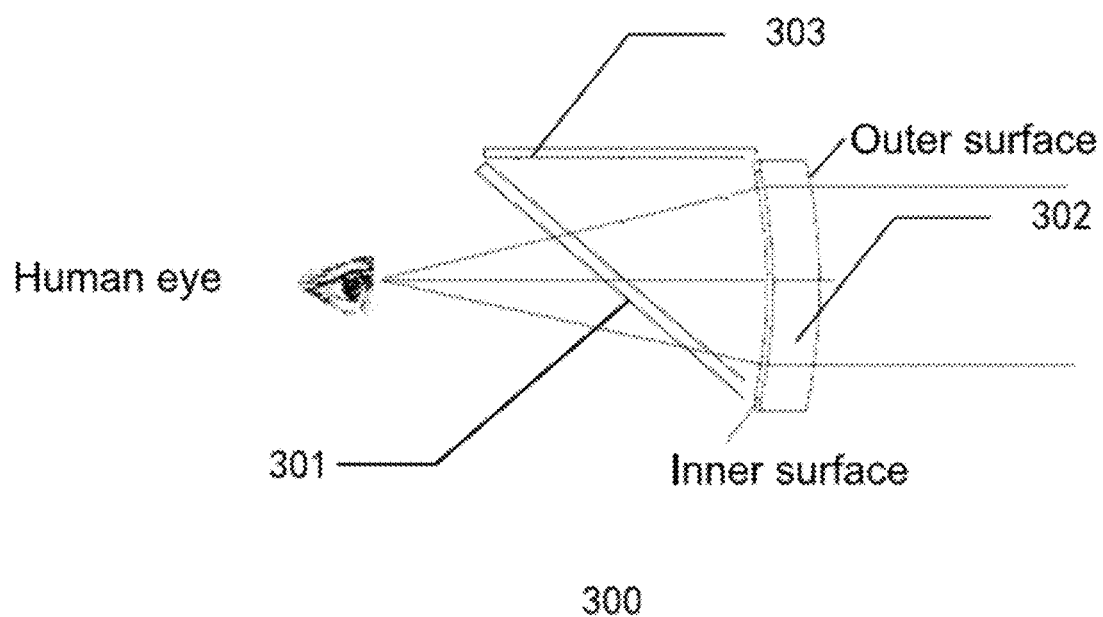
FIG. 2B illustrates a schematic diagram of image formation of a real image in an augmented reality device according to some embodiments of the present disclosure.

An example of an augmented reality device can be referenced to FIG. 2A and FIG. 2B. FIG. 2A illustrates a schematic representation of virtual image formation of the augmented reality devices. FIG. 2B illustrates a schematic diagram of real image formation of the augmented reality device.

As shown in FIG. 2A, the augmented reality device 300 includes a beam splitter 301, an optical apparatus 302 and an image providing device 303.

The beam splitter 301 receives light of an image projected from the image providing device 303 to form a virtual image and reflect the virtual image to the predetermined region of the inner surface of the optical apparatus 302, then the inner surface reflects the light into the user's eyes to achieve the imaging effect of the virtual image. The beam splitter 301 can be any suitable beam splitter.

The optical apparatus 302 includes an inner surface and an outer surface. When the image providing device 303 projects a virtual image of the virtual world, the beam splitter 301 receives the projected light of the image provided by the image providing device 303 and reflects it onto the predetermined region of the inner surface of the optical apparatus 302, and then the inner surface reflects the light into the user's eyes to realize the imaging effect of the virtual image.

In real scene imaging, as shown in FIG. 2B, light of a real world object passes through the outer and inner surfaces of the optical apparatus 302, to allow the light of the real-world object to be refracted for image formation.

The optical apparatus 302 can be made from optical materials and can be made into a form of a mask or a pair of glasses.

The inner surface of the optical apparatus 302 includes a predetermined region. The size of the predetermined region can be determined by using simulation techniques to choose a region having better imaging effect to be the predetermined region of the inner surface. The predetermined region can serve as a curved mirror with predetermined optical parameters. The predetermined optical parameters can include, but be not limited to, the curvature radius, thickness, size and other parameters.

Figure 3A:
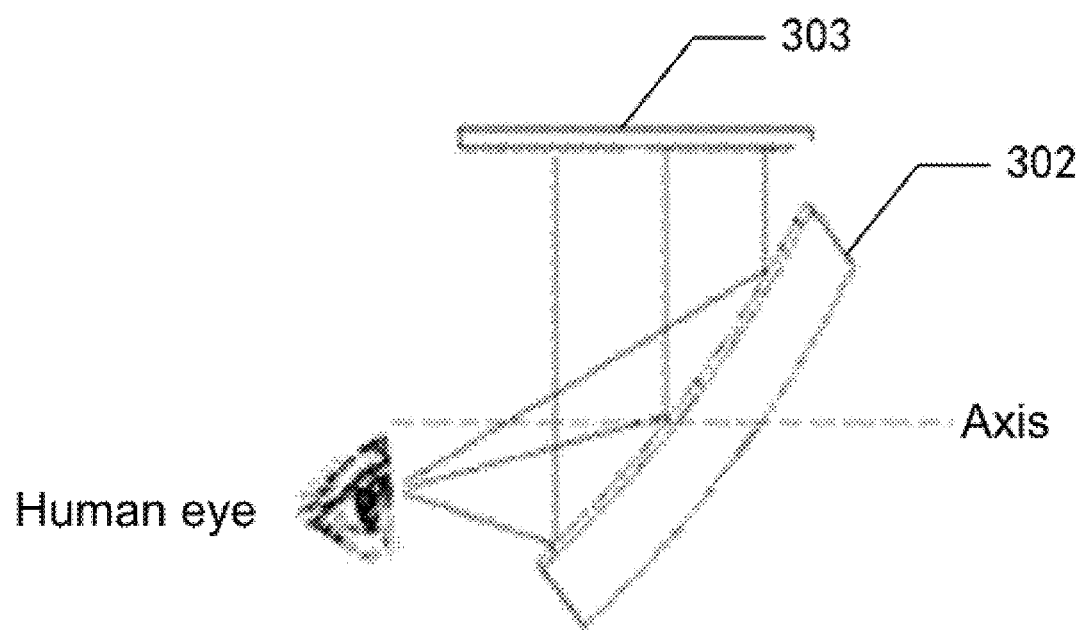
FIG. 3A illustrates a schematic view of an off-axis design of an optical system according to v of the present disclosure.

Optionally, the augmented reality device 300 may not include the beam splitter 301, for example, by designing the optical system as an off-axis system that the surface curvature centers of optical elements do not fall into the same straight line. When the image providing device 303 projects a virtual image of the virtual world, the light directly projects on the inner surface of the optical apparatus 302, then the light is reflected to the user's eyes to realize the imaging effect of the virtual image. FIG. 3A illustrates a schematic of the off-axis design example for an optical system.

As shown in FIG. 3A, the surface curvature center of the optical apparatus 302 is not in the horizontal line, allowing the light to directly radiate onto the inner surface of the optical apparatus 302, then be reflected into the user's eyes.

The disclosed augmented reality device does not require installation of a curved mirror, allowing the augmented reality device to be more compact, with reduced number of required parts and saved materials.

In some embodiments of the present disclosure, the beam splitter and the optical apparatus are of a coaxial design to avoid image ghosting in the augmented reality device.

Figure 3B:
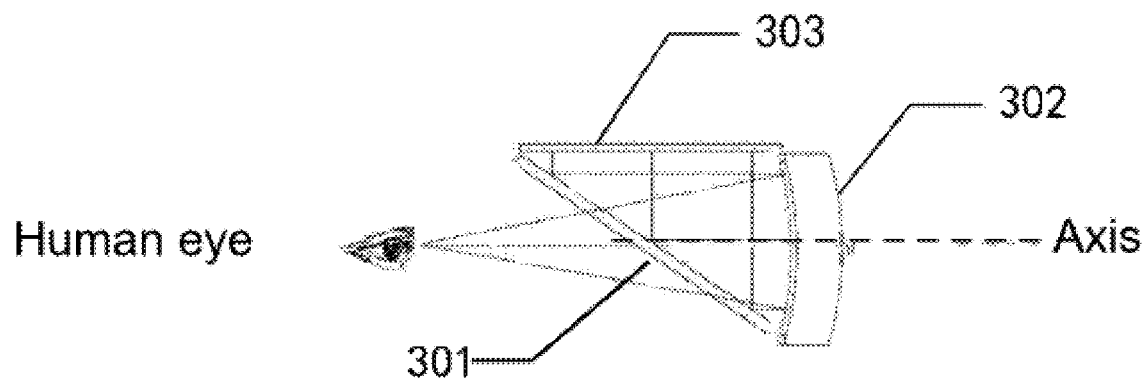
FIG. 3B illustrates a schematic view of a coaxial design of an optical system according to some embodiments of the present disclosure.

FIG. 3B illustrates the schematic diagram of the coaxial design of an optical system. As shown in FIG. 3B, the surface curvature center of the optical apparatus 302 is in a horizontal straight line. The beam splitter 301 receives light from the image providing device 303 and reflects the light onto the predetermined region of the inner surface of the optical apparatus 302, then to the user's eyes.

In some embodiments, the beam splitter 301 and the optical apparatus 302 are designed as the coaxial mode, so that the surface curvature centers of each optical element in the optical system are in the same straight line, to prevent the ghosting phenomenon in the augmented reality device, and to improve the user experience.

Figure 4:
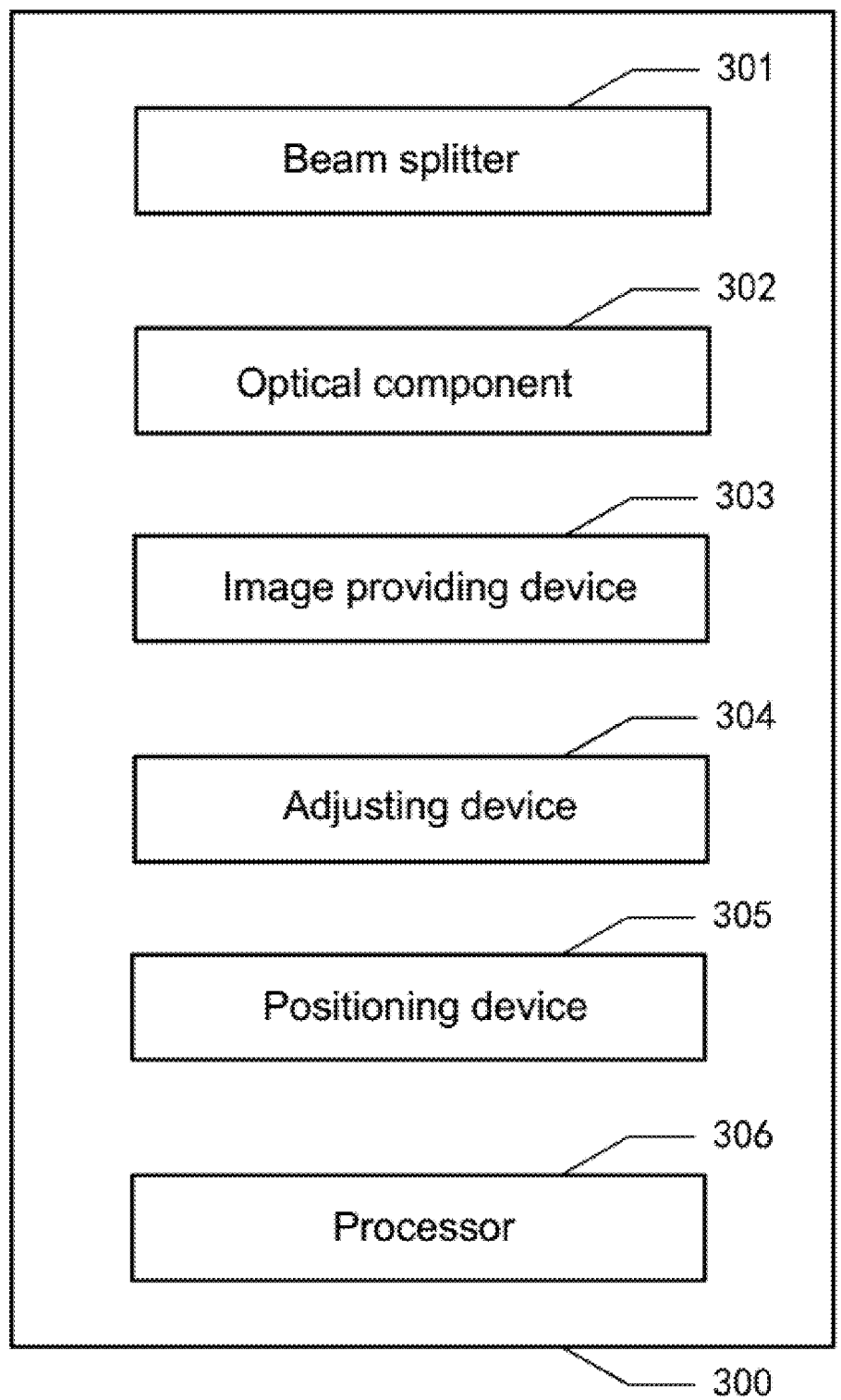
FIG. 4 illustrates a block diagram of another augmented reality device according to some embodiments of the present disclosure.

FIG. 4 illustrates the schematic diagram of an augmented reality device according to some embodiments of the present disclosure.

An augmented reality device 300 further includes an adjustment device 304 for adjusting the relative position between the inner surface of the optical apparatus and the beam splitter to a predetermined relative position.

In this example, a plurality of adjustment positions can be set up in advance for the augmented reality device to adjust the relative position between the inner surface of the optical apparatus and the beam splitter to optimize the relative position between the inner surface and the beam splitter. The relative position between the inner surface of the optical apparatus and the beam splitter can also be adjusted arbitrarily by an adjusting device to meet the user's needs for various application scenarios.

As such, the user experience is improved by optimizing the imaging effect of the augmented reality device.

Optionally, the augmented reality device 300 further includes a positioning device 305, which is used to obtain position information of the augmented reality devices, to adjust the parameters of virtual images projected from the image providing device based on the position information.

When the user uses the augmented reality device, the position information of the user is obtained real time by obtaining the real time position of the augmented reality device since the user and the augmented reality device are coupled together. The user position information can be used to adjust the related parameters of the virtual reality image projected from the image providing device. For example, when the user approaches closer to a real object from a distance, the user may feel the object becoming larger accordingly; and the size, light and other parameters of the virtual image projected from the image providing device can be adjusted to adapt to the distance change between the object and the user.

In this example, the relative parameters of the projected virtual image projected from the image providing device are adjusted based on the position information, that makes the imaging effect of augmented reality device more realistic and enhances the user's immersion expertise.

Optionally, the augmented reality device 300 further includes a processor 306, which is coupled with the positioning device 305 and the image providing device 303 for adjusting the relevant parameters of the virtual image projected from the image providing device 305 based on the position information obtained by the positioning device 303.

The processor can have either a wired connection or a wireless connection between the positioning device and the image providing device. When the user's position changes, the positioning device obtains the change information of the user's position and sends the position information to the processor. The processor adjusts the virtual image parameters, for example, color, luster, size, etc. of the image projected from the image providing device according to the position information.

The processor adjusts the parameters of the virtual image projected from the image providing device based on the position information, which can make the imaging effect of augmented reality device more realistic and enhance the user's immersion experience.

As such, the optical apparatus may be used in augmented reality devices for integrating the virtual world with the real world. The optical apparatus includes an inner surface including a predetermined region, and the predetermined region serves as a curved mirror with predetermined optical parameters for reflection imaging of the virtual world; and an outer surface. The inner surface and the outer surface can be used for refraction imaging of the real world.

FIG. 1C illustrates a schematic diagram of an example of an augmented reality device. As shown in FIG. 1C, the augmented reality device 300 may include a beam splitter 301 and an optical apparatus 302. The optical apparatus 302 includes an inner surface and an outer surface. The inner surface includes a predetermined region that serves as a curved mirror with a predetermined optical parameter. As shown in FIG. 1E, the predetermined region includes a certain size of a predetermined area (1, 2) of the inner surface of the optical apparatus 302.

The predetermined region of the inner surface can serve as a curved mirror with predetermined optical parameters, so that the augmented reality device of the present disclosure eliminates the need for the curved mirror, at least reduces the volume of the augmented reality device that makes the augmented reality device more compact, with reduced number of required parts and saved materials.

In some embodiments of the present disclosure, the predetermined region includes a plurality of first regions with different curvatures.

The curvature of the predetermined region of the inner surface of the optical apparatus can be adjusted to realize the functions of the curved mirror with predetermined optical parameters, by designing the virtual imaging optical path to obtain a better virtual image using an optical design software. The inner surface of the optical apparatus can be an uneven aspherical surface to have a plurality of different curvature regions in the predetermined region.

The outer surface includes a plurality of second regions with different curvatures. The thickness between the inner and outer surfaces is uneven.

Figure 5A:
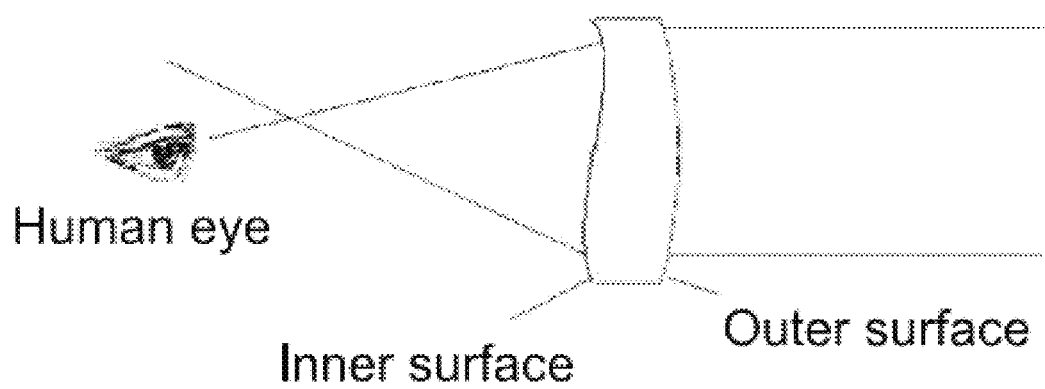
FIG. 5A illustrates a schematic view of irregular twisting of light of a real image through an optical apparatus.

For the real imaging optical path, both the inner and the outer surfaces of an optical apparatus are involved in image formation. If the inner surface of optical apparatus with uneven thickness is optimized for the virtual imaging optical path, to have an aspherical surface and the outer surface is spherical with a uniform curvature, the light of the real image is distorted irregularly through the optical apparatus that causes distortion of the real image. FIG. 5A illustrates such a case of the irregular distortion of the light of the real image through an optical apparatus with uneven thickness that has a spherical outer surface with a uniform curvature and an aspherical inner surface. As shown in FIG. 5A, the light of the real image directly passes through the optical apparatus causing the irregular distortion that makes the light difficult to project onto the user's eyes, resulting in real image distortion.

Figure 5B:
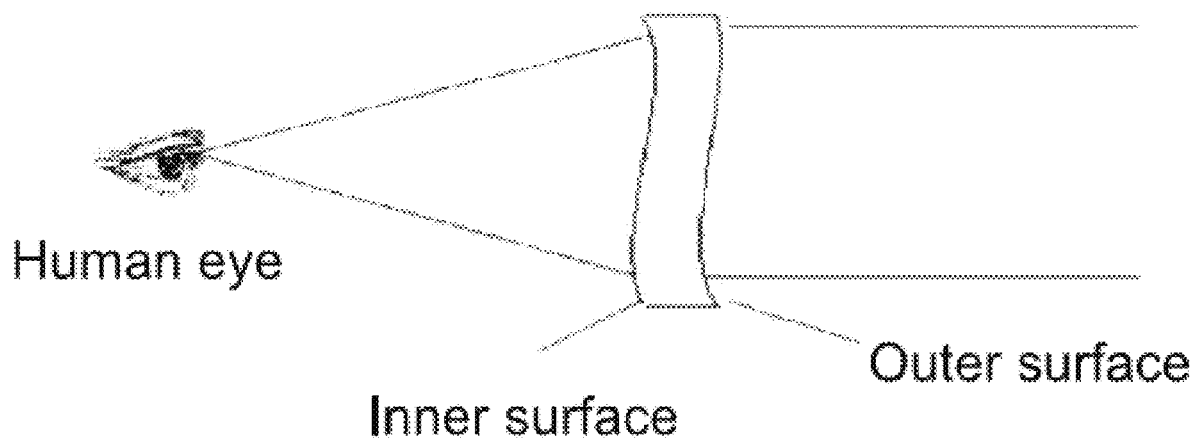
FIG. 5B illustrates a schematic diagram of forming a real image in an augmented reality device according to some embodiments of the present disclosure.

FIG. 5B illustrates a schematic diagram of real image formation of an augmented reality device according to some embodiments of the present disclosure. As shown in FIG. 5B, the light of the real image does not distort when passing through the inner and outer surfaces of the optical apparatus, in response to adjustment of the thickness and/or curvature of the outer surface of the optical apparatus.

In some embodiments of the present disclosure, the inner and outer surfaces of the optical apparatus are non-regular and aspherical surfaces having surface regions with different curvatures and thickness, as opposed to the conventional optical apparatus in which the inner and outer surfaces are regular spherical surfaces with identical curvature and identical thickness for each region of the surfaces. Therefore, the inner surface of the present optical apparatus can serve as a curved mirror with predetermined optical parameters by adjusting the curvature and thickness of each region of the surface.

Optical software can be used for simulation and modeling. Adjusting the thickness and/or curvature of the outer surface of the optical apparatus can avoid distortion of light of the real image passing through the inner and outer surface of the optical apparatus.

Figure 6:
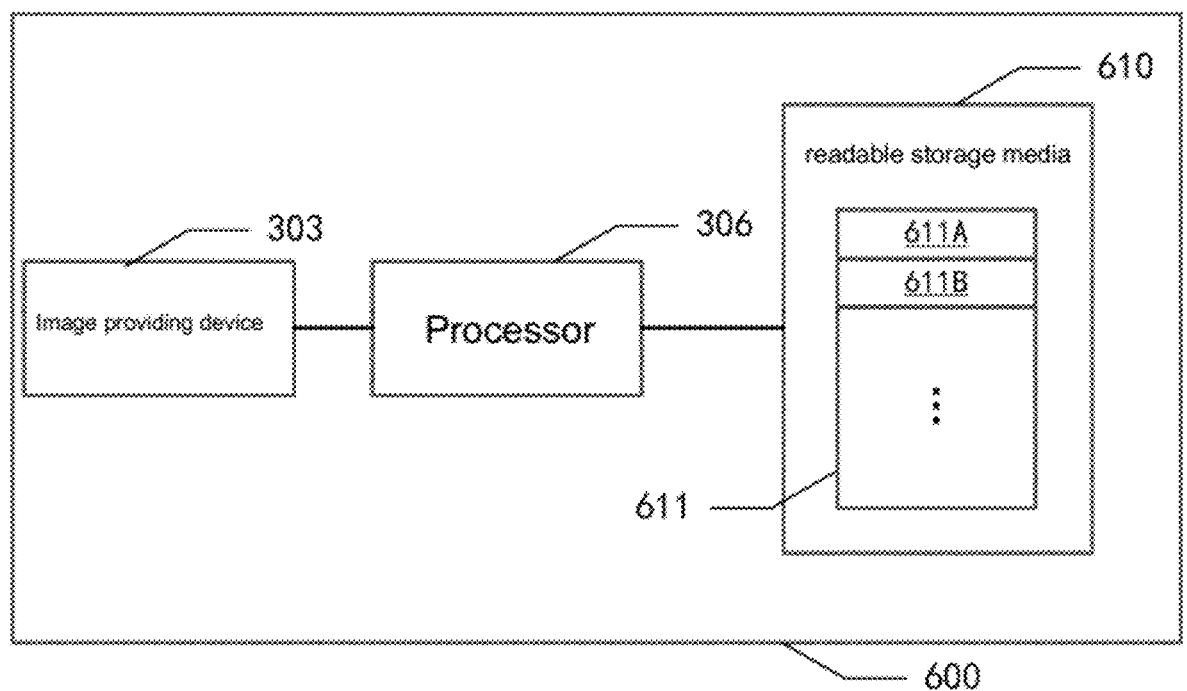
FIG. 6 illustrates a block diagram of another augmented reality device according to some embodiments of the present disclosure.

FIG. 6 illustrates a block diagram of an example of an augmented reality device. As shown in FIG. 6, the augmented reality device 600 includes processor 306, a computer-readable storage medium 610, and an image providing device 303.

The processor 306 can include, but be not limited to, a general-purpose microprocessor, an instruction set processor and/or associated chipsets and/or a dedicated microprocessor (for example, application specific integrated circuits (ASIC)), and so on. The processor 306 can further include onboard storage for caching purposes. The processor 306 can be used to provide parameters to adjust the virtual images projected from the image providing device 303 based on position information obtained by a positioning device.

A computer-readable storage medium 610 may be any suitable medium for storing, transmitting, broadcasting, or transferring instructions. For example, a computer-readable storage medium may include, but be not limited to, electrical, magnetic, optical, electromagnetic, infrared or semiconductor systems, devices, components, or transport media. Specific examples of readable storage media include magnetic storage devices such as tapes or hard disks (HDD), optical storage devices such as optical disks (CD-ROMs), storage such as random-access memory (RAM) or flash memory, and/or wired/wireless communication links.

The computer-readable storage media 610 may also include a computer program 611, which can include a code/computer executable instruction that, when executed by the processor 306, provides relevant parameters for adjusting the virtual image projected from the image providing device 303 based on the position information obtained by the positioning device.

The computer program 611 can be configured to have a computer program code that includes, for example, one or more computer program modules. In an example, the code in computer program 611 can include one or more program modules, such as module 611A, module 611B, etc. It should be noted that the number of modules and partitions are not fixed. Those skilled in the art can use an appropriate program module or program module combination based on the actual situation. When these program module combination is executed by the processor 306, the processor 306 is enabled to provide the relevant parameters for adjusting the virtual image projected from the image providing device 303 based on the position information obtained by the positioning device.

In some embodiments of the present disclosure, the processor 306 can interact with the image providing device 303 to adjust the relevant parameters of the virtual image projected from the image providing device 303, for example, to adjust the position information of the virtual image based on position information obtained from the positioning device.

Those skilled in the art can combine the features/characteristics described in each embodiment of the present disclosure in various ways. Such a combination or combinations falls into the scope of the present disclosure even if the combination or combinations is not described in the present disclosure.

The above embodiments are merely examples of embodiments of the present disclosure and are not intended to limit the scope of the present disclosure. The scope of the present disclosure is defined by the claims. Those skilled in the art can make various modifications or equivalent replacements to the present disclosure within the spirit and scope of the present disclosure, and such modifications or equivalent replacements should also be regarded as falling within the protection scope of the present disclosure.

What is claimed is:

1. An optical apparatus for a wearable augmented reality device, comprising:
    an inner surface, the inner surface being an irregular and aspherical surface and a surface of the optical apparatus that directly faces the user, wherein the inner surface comprises a predetermined region serving as a curved mirror with a predetermined optical parameter for reflection imaging of a virtual image of a virtual world; and
    an outer surface, the outer surface being an irregular and aspherical surface, wherein:
        an axis of the optical apparatus is parallel to a direction of observing the virtual world, the axis of the optical apparatus intersecting with the inner surface region serving as the curved mirror;
        the inner surface and the outer surface are used for refraction imaging of a real image of a real world, and the virtual image and the real image are integrated for forming a scene of augmented reality;
        a thickness between the inner surface and the outer surface is uneven;
        the predetermined region of the inner surface comprises an upper half portion of the inner surface and a lower half portion of the inner surface, one of the upper half portion of the inner surface and the lower half portion of the inner surface having a concave shape until the other one having a convex shape; and
        the outer surface comprises an upper half portion of the outer surface and a lower half portion of the outer surface, one of the upper half portion of the outer surface and the lower half portion of the outer surface having a concave shape until the other one having a convex shape, such that lens comprising the inner surface and the outer surface eliminate distortion for a user of the wearable augmented reality device and the user observes the scene of augmented reality at a focal point of the lens.

2. The apparatus according to claim 1, wherein:
    the inner surface comprises at least two predetermined regions serving as curved mirrors integrated into the inner surface to eliminate distortion due to differences of the virtual image viewed by a left eye and a right eye of the user; and
    the predetermined optical parameter comprises values of curvature radius, thickness and size that matches a corresponding parameter suitable for the curved mirrors for the wearable augmented reality device.

3. An augmented reality device, comprising:
    a memory and a processor for executing instructions stored in the memory;
    a display screen; and
    an optical apparatus; wherein:
        when the instructions are executed by the processor, the processor cause the display screen to provide a virtual image of a virtual world to the optical apparatus; and
        the optical apparatus comprises:
            an inner surface, the inner surface being an irregular and aspherical surface and a surface of the optical apparatus that directly faces a user of the augmented reality device, and the inner surface having a predetermined region serving as a curved mirror with a predetermined optical parameter for reflection imaging of the virtual image of the virtual world; and
            an outer surface, the outer surface being an irregular and aspherical surface, wherein:
                an axis of the optical apparatus is parallel to a direction of observing the virtual world, the axis of the optical apparatus intersecting with the inner surface region serving as the curved mirror;

the inner surface and the outer surface are used for refraction imaging of a real image of a real world, and the virtual image and the real image are integrated for forming a scene of augmented reality;

a thickness between the inner surface and the outer surface is uneven;

the predetermined region of the inner surface comprises an upper half portion of the inner surface and a lower half portion of the inner surface, one of the upper half portion of the inner surface and the lower half portion of the inner surface having a concave shape until the other one having a convex shape; and the outer surface comprises an upper half portion of the outer surface and a lower half portion of the outer surface, one of the upper half portion of the outer surface and the lower half portion of the outer surface having a concave shape until the other one having a convex shape, such that lens comprising the inner surface and the outer surface eliminate distortion for a user of the wearable augmented reality device and the user observes the scene of augmented reality at a focal point of the lens.

4. The device according to claim 3, further comprising:

a beam splitter, for receiving the virtual image projected from the display screen and reflecting the virtual image to the predetermined region of the inner surface of the optical apparatus.

5. The device according to claim 4, wherein the beam splitter and the optical apparatus form a coaxial optical system.

6. The device according to claim 4, wherein the processor is further configured to:

cause an adjusting device disposed inside the augmented reality device to adjust a relative position between the inner surface of the optical apparatus and the beam splitter to be a predetermined relative position.

7. The device according to claim 3, wherein the processor is further configured to:

cause a positioning device to obtain position information of the augmented reality device to adjust a relevant parameter of the virtual image projected from the display screen based on the position information.

8. The device according to claim 3, wherein:

the inner surface comprises at least two predetermined regions serving as curved mirrors integrated into the inner surface to eliminate distortion due to differences of the virtual image viewed by a left eye and a right eye of the user; and the predetermined optical parameter comprises values of curvature radius, thickness and size that matches a corresponding parameter suitable for curved mirrors in the augmented reality device.

* * * * *